Figure 1:
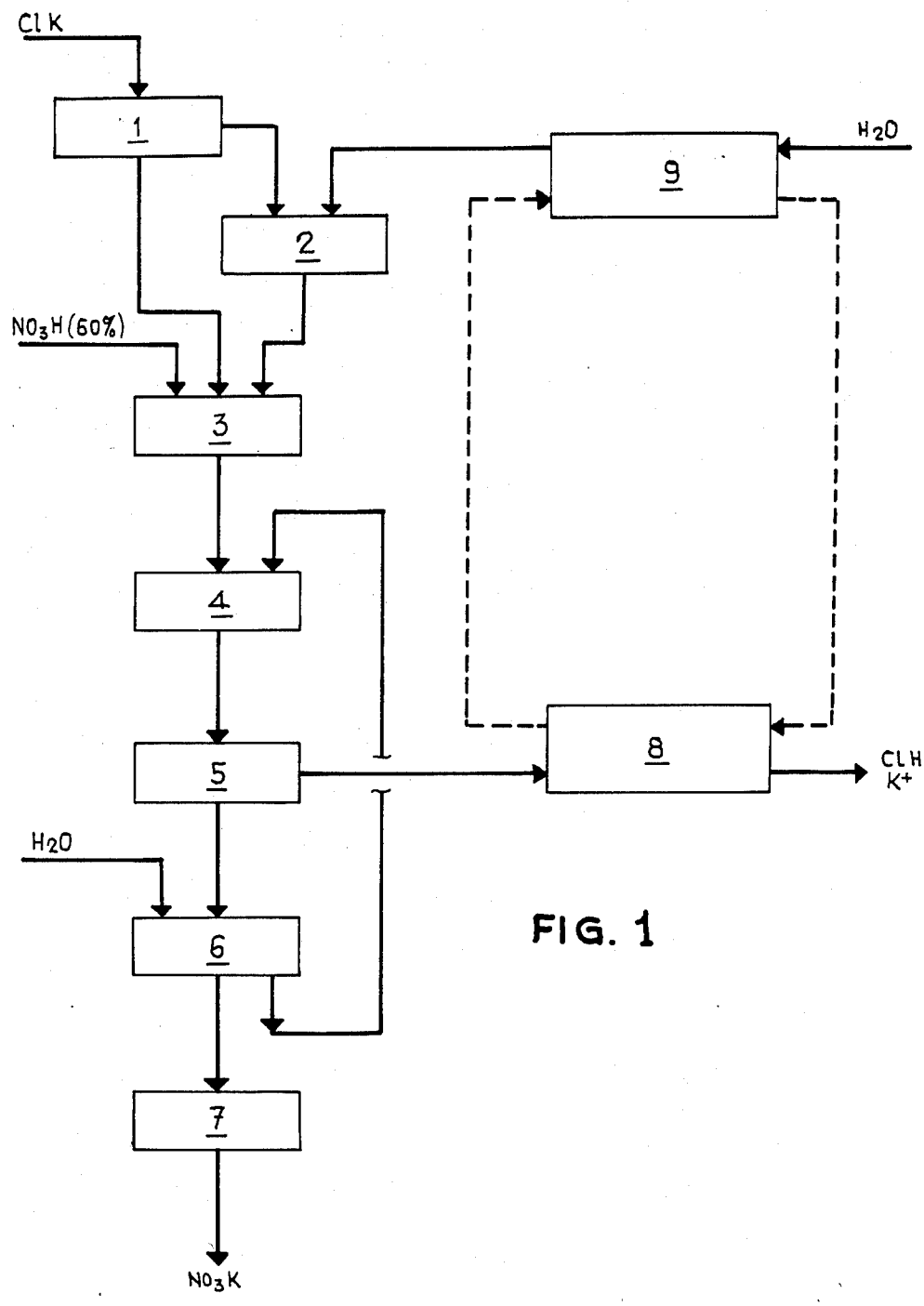

United States Patent [19]

Portela

[11] Patent Number: 4,668,495

[45] Date of Patent: May 26, 1987

[54] PROCESS FOR OBTAINING POTASSIUM NITRATE FROM POTASSIUM CHLORIDE AND NITRIC ACID

[75] Inventor: Luis S. Portela, Huelva, Spain

[73] Assignee: Union Explosivos Rio Tinto, S.A., Madrid, Spain

[21] Appl. No.: 771,294

[22] Filed: Aug. 30, 1985

[51] Int. Cl.$^4$ .................. C01B 21/48; C01D 9/04; C01F 11/38

[52] U.S. Cl. ................... 423/395; 423/179; 423/194; 423/395; 423/481; 71/59; 149/61

[58] Field of Search ............. 423/179, 194, 395, 390, 423/481, 482; 149/61; 71/58, 59

[56] References Cited

U.S. PATENT DOCUMENTS

| | | | |
|---|---|---|---|
| 1,604,660 | 10/1926 | Ross et al. | 423/395 |
| 1,929,002 | 10/1933 | Mitteau | 423/395 |
| 3,983,222 | 9/1976 | Lehto | 423/194 |
| 4,285,924 | 8/1981 | Pratt | 423/390 |
| 4,364,914 | 12/1982 | Manor et al. | 423/390 |
| 4,378,342 | 3/1983 | Manor et al. | 423/390 |

FOREIGN PATENT DOCUMENTS 975324 11/1964 United Kingdom ............ 423/390

*Primary Examiner*—John Doll
*Assistant Examiner*—Robert M. Kunemund
*Attorney, Agent, or Firm*—Eric Y. Munson

[57] ABSTRACT

The present invention provides a process for manufacture of potassium nitrate from potassium chloride and nitric acid. A source of potassium chloride may be screened and separated into fine and coarse fractions, or the screening may be eliminated and the source may be separated into equal coarse fractions. The coarse fraction, when screening has occurred, or one of the equal fractions, where no screening has occurred, is dissolved in a dilute solution of nitric acid prior to any reaction. Thereafter, either the fine fraction (if screening occurred) or the other equal fraction (if no screening occurred) reacts with the dilute nitric acid-potassium chloride solution and additional nitric acid having a concentration of about 60% at ambient temperature. The resulting solution may be crystallized with or without the prior separation of solid potassium nitrate. Nitric acid is recovered by solvents from a residual brine solution after crystallization. The recovered nitric acid is washed to provide a nitric acid solution having a concentration of 3% to 10% which is recycled for use at the beginning of the process to dissolve the coarse fraction of potassium chloride prior to the reaction stage.

7 Claims, 2 Drawing Figures

PROCESS FOR OBTAINING POTASSIUM NITRATE FROM POTASSIUM CHLORIDE AND NITRIC ACID

The present invention relates to the preparation of potassium nitrate by reacting potassium chloride of any random particle size with nitric acid.

In this process, the reaction takes place in an aqueous medium at ambient temperature and in the absence of solvents, so as to obtain a potassium nitrate which is substantially chloride-free, which can be used as a fertilizer and optionally is suitable for the production of explosives. In addition, both the nitric acid and the hydrochloric acid are recovered with a concentration suitable for subsequent use. This recovery takes place by extracting with solvents.

With regards to the grain size characteristics of the KCl, in certain cases it is necessary to grind same beforehand in order to bring about its total reaction with $HNO_3$ making it possible to obtain an appropriate $KNO_3$ with 13% N and 46% $K_2O$.

The object of the present invention is to provide a simple process for the continuous or discontinuous preparation of $KNO_3$ from potassium chloride from any source and of any size and nitric acid. Firstly the KlC is partly solubilized at ambient temperature with a very dilute $HNO_3$ solution. This is followed by the reaction between the partly dissolved KCl and higher concentration nitric acid.

The major advantage of the process according to the present invention is that the reaction takes place at ambient temperature, unlike in the processes known and described in Spanish Pat. No. 501 479 and French Pat. No. 2 481 688, where the reaction temperature is below 0° C.

Another important feature of the process according to the present invention is the use of a crystallization system by direct contact with a previously cooled petroleum fraction. It is also an advantage of the process according to the invention that it is possible to obtain potassium nitrate of two qualities for use as a fertilizer and with a high degree of purity for the production of explosives, because the process permits two variants which will be described hereinafter.

DESCRIPTION OF THE INVENTION

The process according to the present invention for the preparation of potassium nitrate is described hereinafter relative to two embodiments issued by the flow diagrams of FIGS. 1 and 2, in which the different phases are defined by the reference numerals given hereinafter:
1. Screening.
2. Dissolving.
3. Reacting.
4. Crystallizing.
5. Solid-liquid separation.
6. Washing.
7. Drying.
8. Extraction with solvents.
9. Solvent washing.
10. Screening.
11. Dissolving.
12. Reacting.
13. Solid-liquid separation.
14. Crystallization.
15. Solid-liquid separation.
16. Washing.
17. Drying.
18. Washing.
19. Drying.
20. Extraction with solvents.
21. Solvent washing.

With reference to FIG. 1, firstly and optionally, the KCl is dry-screened with the separation of two equal coarse and fine fractions. If prior screening has taken place, all the coarse KCl fraction is dissolved. If no such prior screening takes place, approximately 50% of the KCl is added at ambient temperature to a dilute nitric acid solution with a concentration of approximately 3 to 10% by weight and assumed to be between 5 and 10% of the stoichiometric $HNO_3$. This nitric acid dissolving follows the $HNO_3$ recovery stage by extraction with solvents.

The reaction then takes place between the KCl from the dissolving stage, plus the fines fraction in the case of previous screening, with the nitric acid having a 60% by weight concentration in an aqueous medium, at ambient temperature and preferably between 15° and 30° C., using the reagents in a molar proportion of 0.9 to 1 mole with respect to the initially supplied potassium chloride.

When the reaction is completed, crystallization takes place by cooling the stream to a temperature between 0° and −30° C. in a crystallizer, whose design permits direct contact with a previously cooled petroleum fraction.

This is followed by the separation of the potassium nitrate crystals from the resultant brine at an approximate temperature of 20° C., washing with water and drying, leading to $KNO_3$ as the end product.

The brine obtained in the previous stage is processed by extraction procedures using solvents in order to obtain a brine containing hydrochloric acid with a concentration between 15 and 20% by weight and which is free from nitrate ions and the $HNO_3$-containing solvent extract is washed with water to recover the solvent and bring about $HNO_3$ dissolving, which is recirculated for the prior dissolving of KCl, as described hereinbefore.

The organic phase used in this operation is an organic solvent, optionally combined with an inert diluent. Appropriate solvents are ketones with 5 to 10 carbon atoms, polyalkylene glycols, phosphoric, phosphonic and phosphinic acid derivatives and linear or cyclic polyesters. Kerosene, decanes and naphtha can be used as organic diluents.

Figure 2:
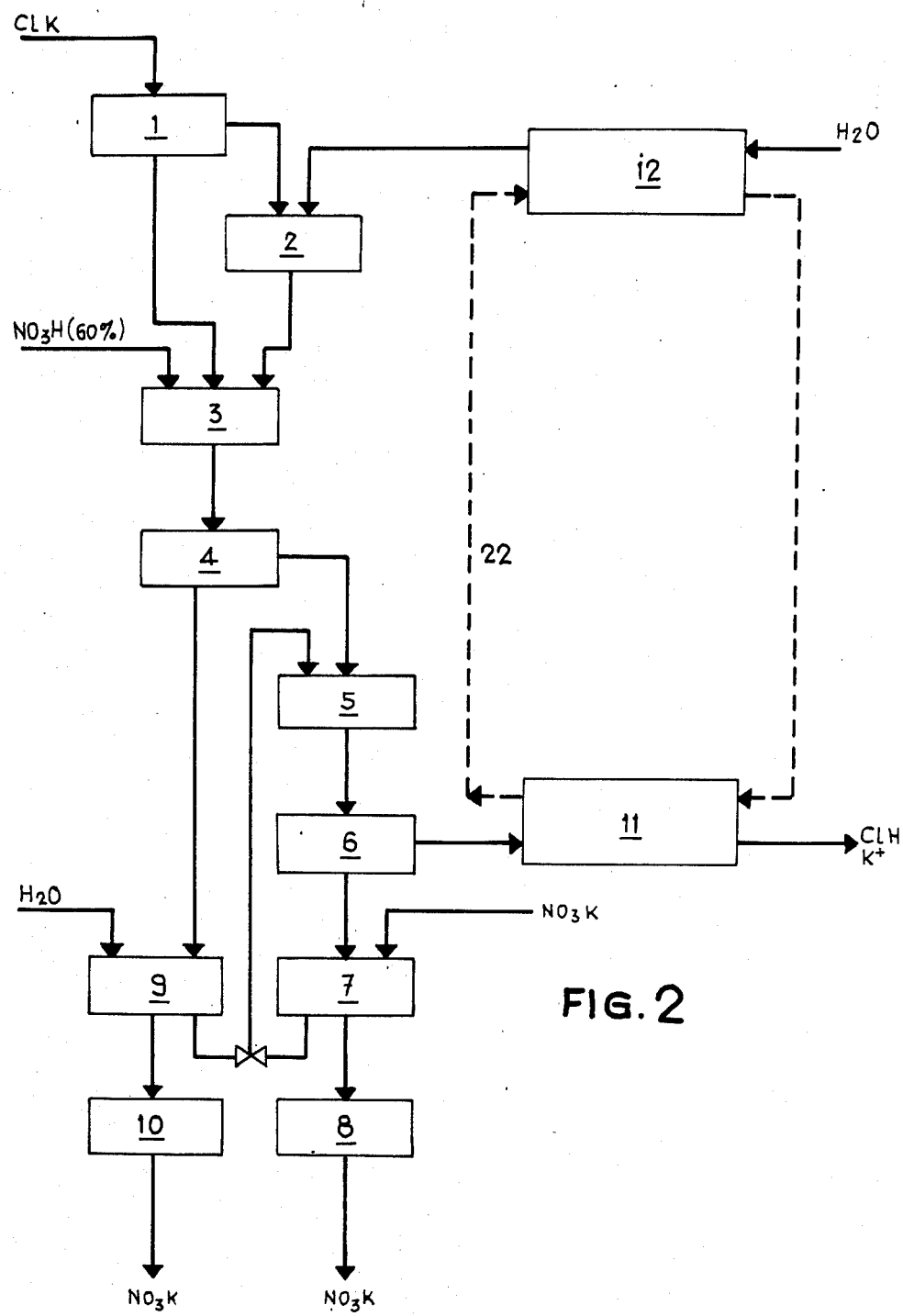

FIG. 2 is the flow diagram of the second embodiment in which potassium nitrate of two qualities is obtained. The first stage of the process is the same as in the previous embodiment. However, the second stage differs and once the reaction is completed involves a solid-liquid separation, so that on the one hand a solid potassium nitrate is obtained, which is washed and dried as a fertilizer quality product and on the other hand crystallization takes place of the $KNO_3$ dissolved in the brine in the same way as in the first embodiment. In this way it is possible to obtain potassium nitrate crystals with a purity above 99%. As in the first embodiment, the brine obtained in the previous stages is used for carrying out the corresponding extraction with solvents in order to obtain a solution containing hydrochloric acid and a $HNO_3$-containing solvent extract which is recovered and recycled.

The following examples serve to illustrate the invention in a non-limitative manner.

EXAMPLE 1 (FIG. 1)

100 Kg/h of 96% pure commercial potassium chloride obtained from sylvinite flotation is screened dry through a 0.420 mm screen. The coarse fraction is supplied to a dissolving container, together with 150 Kg/h of 3.3% by weight nitric acid recycled from the washing of the organic phase of the extraction with solvents stage and total dissolving takes place at ambient temperature. Once the potassium chloride has dissolved, it is supplied together with the remaining fines fraction and 127 Kg/h of 60% by weight nitric acid to the reaction container, keeping it at a temperature of 24° C. The suspension of solids and liquids is passed directly to the crystallization stage, together with the wash waters from the final product operation, the temperature being lowered to −15° C. by the direct injection of previously subcooled kerosene. The aqueous phase obtained at the bottom of the crystallizer contains 30.5% by weight of solids. This is followed by centrifuging, leading to 148 Kg/h of moist cake and 279 Kg/h of liquid phase (brine). This is followed by the recovery of the nitrate ions of the brine in a group of mixer-settlers using a 25/75 volume mixture of tributyl phosphate and kerosene as the organic solvent which is selective for this ion.

This leads to an aqueous stream with a composition of 23 g/l of KCl and 171.4 g/l of HCl. The nitrate ion-containing organic phase is then washed with water in a second group of mixer-settlers, leading to a nitric solution recirculated to the dissolving vessel and a regenerated organic phase which is reused in the extraction. The moist cake is washed in the same equipment and the wash waters are recirculated to the crystallizer. This leads to 125.3 Kg/h of a 98.6% pure potassium nitrate.

EXAMPLE 2

The starting product is 100 Kg/h of the same potassium chloride as in the previous example, followed by screening and dissolving under the same conditions as described in Example 1. The subsequent reaction takes place at a temperature of 22° C. for 45 minutes. The suspension is then filtered so that, after the solid has been appropriately washed and dried, there is a production of 90 Kg/h of potassium nitrate crystals, which are 96.8% pure over a dry base.

The liquid phase from the solid-liquid separation consisting of dissolved potassium nitrate and hydrochloric acid undergoes crystallization in a container by direct cooling with a petroleum fraction which is immiscible with the cooled aqueous phase, giving an aqueous phase outlet temperature of −15° C. with 35.12 Kg/h of $KNO_3$ crystals, which are separated from the liquid phase, washed and dried, giving a potassium nitrate which is more than 99.5% pure and suitable for use as a starting material for the production of explosives.

The liquid phase obtained in this final separation is processed by extraction with solvents, as in Example 1.

EXAMPLE 3

The flow diagram of FIG. 1 is followed, although the prior screening operation (1) is not carried out.

Into a first reaction vessel are introduced 100 Kg/h of KCl, resulting from sylvinite flotation with 51.5 Kg/h of 60% by weight nitric acid and 144.2 Kg/h of 6.73% by weight dilute nitric acid, resulting from the recovery of the $NO_3^-$ ion of the final solvent extraction stage. The temperature is maintained at 23° C. for 90 minutes. The suspension is then passed to a second container, to which are added at ambient temperature 67.6 Kg/h of 60% by weight nitric acid.

The residence time in this second reactor is 90 minutes. Once the chloride has been converted into nitrate, the resulting suspension (363.27 Kg/h) is transferred to a crystallizer similar to that described in the previous examples, the liquid phase being cooled to −6° C. in order to recover in crystalline form most of the dissolved potassium nitrate. This is followed by the centrifuging of the stream from the crystallizer, with the separation of 278.8 Kg/h of liquid phase containing 4.4% of dissolved $KNO_3$ to be processed in the solvent extraction phase described in the previous examples for recovering all the $NO_3^-$, as well as a moist cake which, once washed and dried gives 119.5 Kg/h of a product suitable for use as a fertilizer.

I claim:

1. A process for obtaining potassium nitrate from potassium chloride and nitric acid, said process comprising the steps of:
   (a) dissolving a previously screened coarse potassium chloride fraction, or dissolving approximately 50% of a source of potassium chloride if no previous screening has occurred, a solution consisting of dilute nitric acid having a concentration of between 3 to 10% by weight;
   (b) allowing said dilute nitric acid-potassium chloride solution to react with the fine portion of said potassium chloride if a previous screening has occurred, or said remaining 50% of said source of potassium chloride if no previous screening has occurred, an additional solution consisting of nitric acid having a concentration of substantially 60% by weight, at ambient temperature;
   (c) crystallizing the solution of (b), or in the alternative, separating solid potassium nitrate and thereafter crystallizing the residue to obtain potassium nitrate having a purity of at least 99.5%;
   (d) processing the residual brine resulting from the crystallization step including the steps of extracting nitric acid from said residual brine with solvents to result in a solution containing hydrochloric acid with a concentration between 10% and 20% and a solvent extract, washing said solution to recover nitric acid having a concentration of between 3% and 10%, and recycling said recovered nitric acid for use as said dilute nitric acid in (a).

2. A process for obtaining potassium nitrate from potassium chloride and nitric acid according to claim 1, wherein the reagents are used in a proportion of 0.9 to 1 mole of nitric acid per mole of potassium chloride.

3. A process for obtaining potassium nitrate from potassium chloride and nitric acid according to claim 1, wherein the potassium chloride used can be of any source and of any grain size.

4. A process for obtaining potassium nitrate from potassium chloride and nitric acid according to claim 1, wherein the hydrochloric acid obtained as the secondary product has a concentration between 10 and 20% by weight and is free from nitrate ions and solvents.

5. A process for obtaining potassium nitrate from potassium chloride and nitric acid according to claim 1, wherein crystallization takes place by cooling by direct contacting with a previously cooled petroleum fraction, preferably kerosene or N-decane.

6. The process of claim 1 further including the step of recovering said solvents added during the processing of said residual brine so that said recovered solvents may be reused in said process.

7. The process of claim 1 wherein said ambient temperature at which said reaction of (b) occurs is between 10° C. and 35° C.

* * * * *